United States Patent
Eichner et al.

(10) Patent No.: US 7,051,449 B2
(45) Date of Patent: May 30, 2006

(54) COORDINATE MEASURING DEVICE

(75) Inventors: Lutz Eichner, Giessen (DE); Matthias Andras, Florstadt-Stammheim (DE); Michael Nickl, Perlesreut (DE); Ralf Christoph, Giessen (DE)

(73) Assignee: Werth Messtechnik GmbH, Giessen (DE)

( * ) Notice: Subject to any disclaimer, the term of this patent is extended or adjusted under 35 U.S.C. 154(b) by 0 days.

(21) Appl. No.: 10/969,209

(22) Filed: Oct. 21, 2004

(65) Prior Publication Data

US 2005/0086821 A1   Apr. 28, 2005

(30) Foreign Application Priority Data

Oct. 24, 2003  (DE) ............................... 103 49 947

(51) Int. Cl.
*G01B 5/004* (2006.01)

(52) U.S. Cl. ............................ 33/503; 33/559; 33/1 M

(58) Field of Classification Search .................. 33/503, 33/1 M, 556, 559

See application file for complete search history.

(56) References Cited

U.S. PATENT DOCUMENTS

| 3,813,789 | A | * | 6/1974 | Shelton ........................ 33/503 |
| 4,631,834 | A | * | 12/1986 | Hayashi et al. ................ 33/503 |
| 6,161,294 | A | * | 12/2000 | Bland et al. .................. 33/1 M |
| 6,694,627 | B1 | * | 2/2004 | Ito et al. ...................... 33/1 M |
| 6,857,195 | B1 | * | 2/2005 | Ruijl ............................ 33/503 |
| 2004/0205974 | A1 | * | 10/2004 | Ogura .......................... 33/503 |

FOREIGN PATENT DOCUMENTS

| DE | 3 733617 | 4/1989 |
| DE | 4 126532 | 2/1993 |
| DE | 19 639780 | 4/2002 |

OTHER PUBLICATIONS

Ralf Christoph et al., "Multisensor Coordinate Metrology", Library of Technology, vol. 248. pp. 10-12.

* cited by examiner

*Primary Examiner*—Yaritza Guadalupe
(74) *Attorney, Agent, or Firm*—Dennison, Schultz, Dougherty & MacDonald

(57) ABSTRACT

A coordinate measuring device for measuring three-dimensional or two-dimensional objects in the direction of the X, Y and Z axes of the coordinate measuring device. The X and Y measuring axes run in one plane in order to achieve a compact unit and a high measuring accuracy.

8 Claims, 2 Drawing Sheets

COORDINATE MEASURING DEVICE

BACKGROUND OF THE INVENTION

The invention concerns a coordinate measuring apparatus for measuring three-dimensional or two-dimensional objects in the direction of the X, Y and Z axes of the coordinate measuring device, comprising a measuring table that accommodates the object and can be displaced in the direction of the X axis of the coordinate measuring device, as well as a carriage that can be displaced in the direction of the Y axis of the coordinate measuring device, from which a spindle sleeve extends that can be displaced in the direction of the Z axis of the coordinate measuring system.

The usual embodiments of optical and multisensor coordinate measuring devices are characterized in that the movable axes are arranged distributed between the movement of the measuring object (measuring table) and the movement of the sensors (Z axis). This occurs in order to achieve a sufficiently compact device concept and obtain a guide surface that is as close as possible to the measuring plane that is generally in the interior of the table. As an alternative coordinate measuring devices with movable bridges are also available. In these, only the sensor is moved. A disadvantage that affects this arrangement is, however, that the guide axes have to be arranged at a great distance from the measuring location in the table plane, that is, at the height of the bridge. The guide errors induced by the long lever arms lead to great measuring errors.

The same problems occur when utilizing coordinate measuring devices with an L-shaped construction, since the guideway is arranged in a measuring direction that is far away from the measuring table surface.

The design and assembly of corresponding coordinate measuring devices can be found in German publication entitled Multisensor Coordinate Measuring Technology, Library of Technology, Volume 248, in particular on page 11.

From DE-C-37 33 617 we know of a multiple coordinate measuring machine, in which a measuring table can be displaced on two first guideways along the X axis and a carriage with column can be displaced by two second guideways along the Y axis of the coordinate measuring device. A displaceable carriage extends from the column in the Z direction. The second guideways that guide the carriage run on a separate stand with a lateral offset to the first guideways.

In a coordinate measuring device according to DE-A-41 26 532, bearings are imbedded into a base plate, along which a measured value sensor can be moved in the X and Y directions. The bearings run in different planes. There is also the possibility of mounting a workpiece support on the base plate, which can be supported by air bearings that extend in one plane on one of the bearings of the measured value sensor, but are at a distance therefrom.

SUMMARY OF THE INVENTION

The object of the present invention is to further develop a coordinate measuring device of the kind mentioned above in order to prevent for the most part the occurrence of measurement errors induced by guide errors. A compact design should be achieved at the same time.

The object is attained in accordance with the invention essentially with a coordinate measuring device for measuring three-dimensional or two-dimensional objects in the X, Y and Z axial directions of the coordinate measuring device, which comprises a measuring table that accommodates the object and can be displaced in the direction of the X axis of the coordinate measuring device, as well as a carriage that can be displaced in the direction of the Y axis of the coordinate measuring device, from which a spindle sleeve extends that can be displaced in the direction of the Z axis of the coordinate measuring device, wherein the measuring table can be displaced on two first guideways and the carriage can be displaced on at least one guideways, the two first guideways and the at least one second guideway run in or approximately in one plane; and the at least one second guideway runs at least in sections between the two first guideways or sections of the two first guideways. It is particularly provided that the carriage can be adjusted on two second guideways, of which at least one runs between the two first guideways.

In other words, the guideway for the measuring table (usually in the Y direction) and the guideway for the carrier of the spindle sleeve (Z axis), which typically runs in the X direction, are arranged on a common reference surface or approximately on a common reference surface. In this way, it is additionally achieved that a low overall height is required for the arrangement of the guide systems. The main motion axes are consequently located approximately in the preferred measuring plane of the coordinate measuring device.

As a consequence, at least one guideway of one measuring axis runs between the guideways of a second measuring axis, while the measuring axes themselves run in or almost in a plane.

The guide mechanism of the measuring table and the carriage or support of the spindle sleeve according to the invention or a corresponding element for measuring in the direction of the Z axis is particularly suitable for an optical or multisensor coordinate measuring device, without this constituting a limitation of the teaching of the invention.

The top surface of the measuring table should also be transparent to ensure translucence for transillumination.

The guideways of the measuring table and the support or carriage should run in part or preferably in their entirety under the measuring table.

As sensors for the coordinate measuring device sensing devices and/or image processing and/or laser sensors and/or tactile-optical fiber sensing devices should be taken into consideration.

The guideways used can be those intended for a purely mechanical bearing, air bearing, or magnetic bearing.

BRIEF DESCRIPTION OF THE DRAWINGS

Further details, advantages, and features of the invention arise not only from the claims and the features that can be inferred therefrom (per se and/or in combination), but also from the following description of one of the preferred exemplary embodiments shown in the drawings, in which:

DESCRIPTION OF THE PREFERRED EMBODIMENTS

Figure 1:
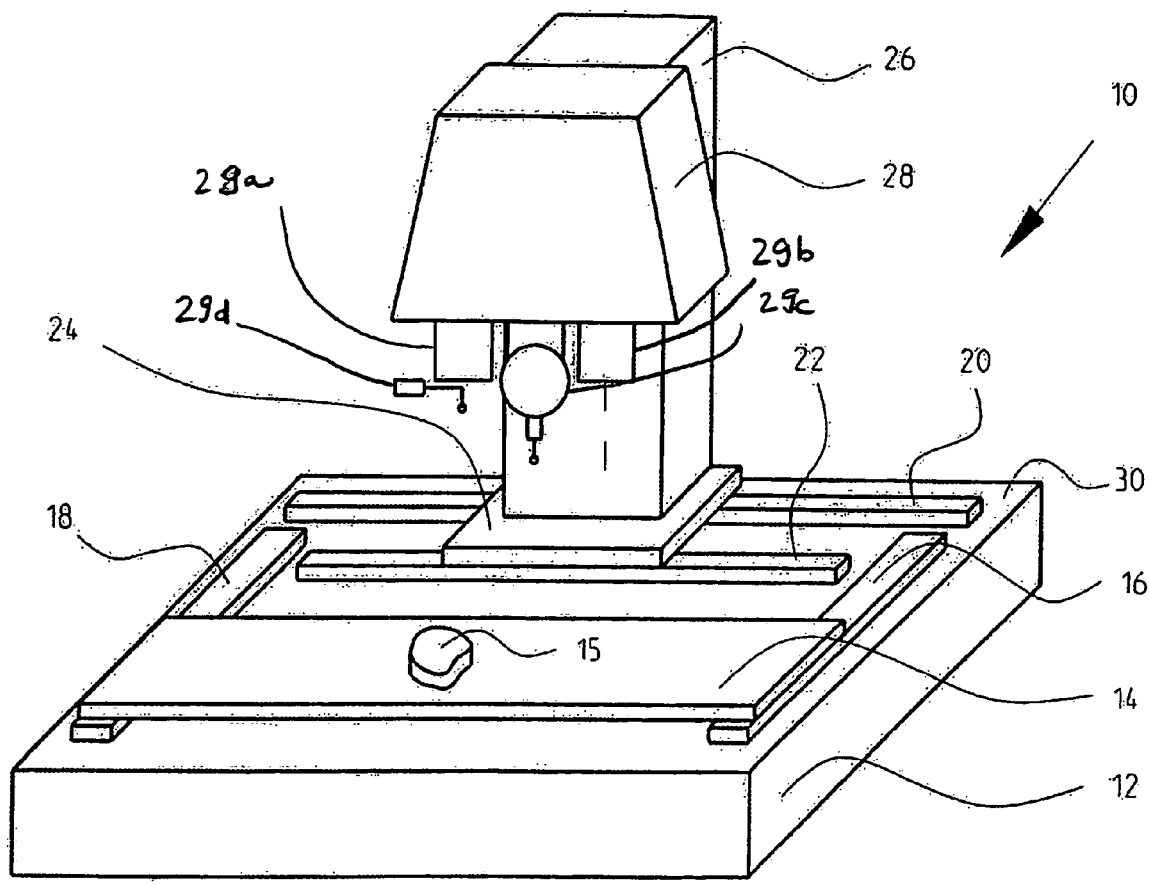
FIG. 1 shows a schematic diagram of a coordinate measuring device.

From FIG. 1 can be inferred in principle a coordinate measuring device 10, comprising a base frame 12, which in the example is made of granite, having a measuring table 14, on which a workpiece 15 can be arranged, whose geometry or surface properties or other characteristic measurements are supposed to be measured.

The measuring table 14 can be displaced along guideways 16, 18, which extend from the base frame 12 and extend in the Y direction of the coordinate measuring device 10.

Two second guideways 20, 22 run vertical to the first guideways 16, 18 in the rear part of the base frame 12, that is, in the X direction. From the guideways 20, 22 a carriage or slider 24 extends, from which in turn a rigid column 26 extends, which runs in the Z direction.

Along the column 26 that runs in the Z direction also a slider or carriage 28 having sensors extends, which is also described as a spindle sleeve. The latter can also be a sensing device, for example, an image processing 29a, a laser sensing device 29b, or a tactile sensing device 29c, or a combination of these such as a multi-sensor tactile-optical fiber sensing device including image processing device 29a and a fiber probe 29d.

As clarified in the drawing according to FIG. 1, the first guideways 16, 18 of the measuring table 14 run in one plane, in which run also the two second guideways 20, 22 for the slider or carriage 24 that can be displaced in the X direction. Consequently, the horizontal X and Y measuring axes extend in one plane, which in the exemplary embodiment runs parallel to the upper surface 30 of the base frame 12 or is formed thereby. The plane is furthermore located near the measuring table surface, on which the workpiece 15 to be measured is positioned.

Figure 2:
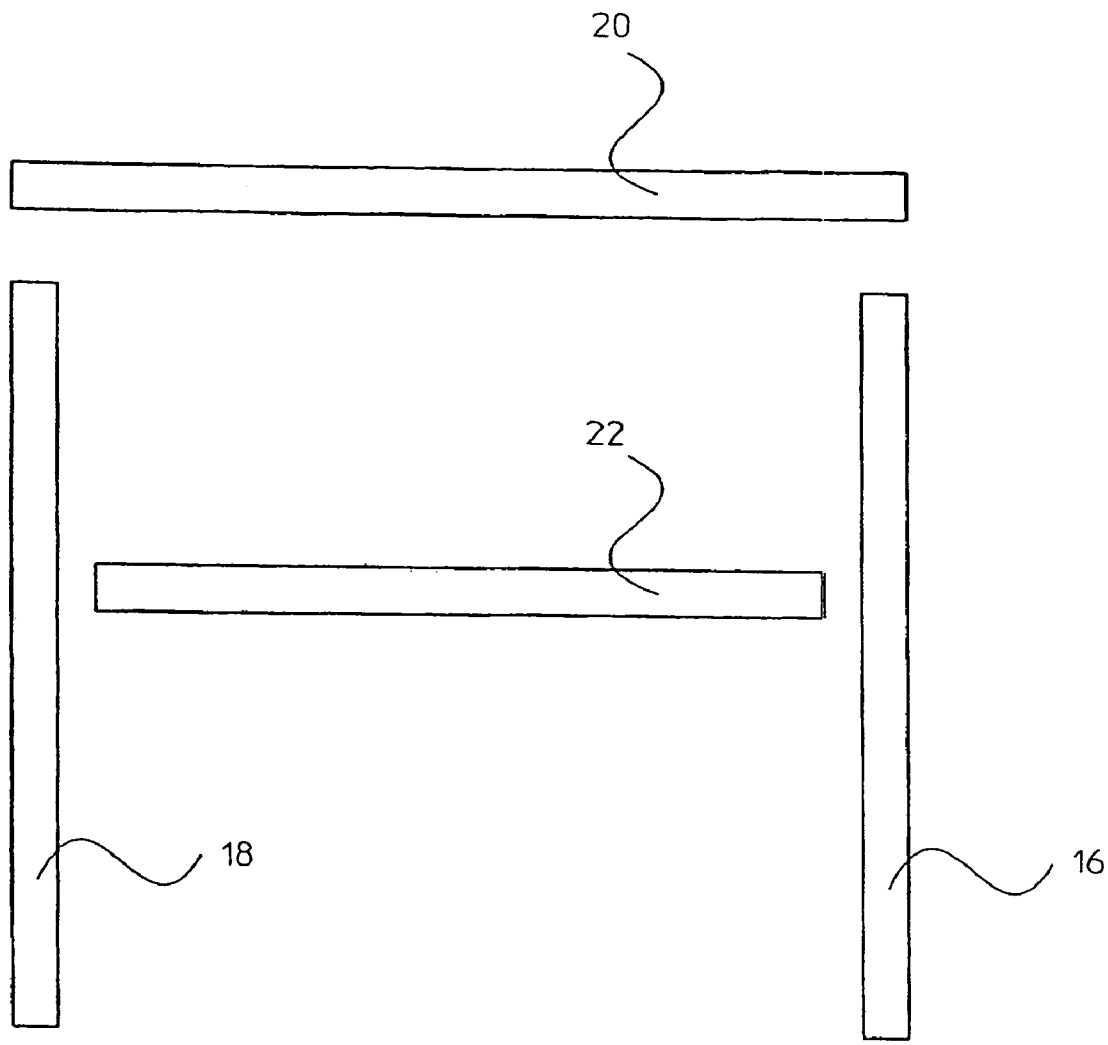
FIG. 2 shows guideways of the coordinate measuring device in accordance with FIG. 1.

In FIG. 2 are depicted again in plan view the two first and second guideways 18 of the measuring table 14 and the two second guideways 20, 22 of the carriage or slider 24 that can be displaced in the X direction. It can be seen that one of the second guideways, namely the guideway 22, extends between the first guideways 16, 18 of the measuring table 14. In this way a compact design results. The guideways 16, 18, 20, 22 extend preferably underneath the measuring table 14, so that the latter is not encumbered in its movement by the guideways 16, 18, 20, 22.

The measuring table 14 should also be configured in such a way that transillumination is possible. For this purpose, the measuring table can be transparent.

The guideways 16, 18, 20, 22 are configured in such a way that a bearing of the measuring table 14 or the carriage 24, that is, a mechanical bearing, air bearing, or magnetic bearing, occurs in the usual way.

What is claimed is:

1. A coordinate measuring device (10) for measuring three-dimensional or two-dimensional objects (15) in the direction of the X, Y and Z axes of the coordinate measuring device, comprising a measuring table (14) that accommodates the object and can be displaced in the direction of the X axis of the coordinate measuring device, as well as a carriage (24) that can be displaced in the direction of the Y axis of the coordinate measuring device, from which a spindle sleeve (28) extends that can be displaced in the direction of the Z axis of the coordinate measuring device, wherein the measuring table (14) can be displaced on two first guideways (16, 18) and the carriage can be displaced on at least one guideway (20, 22), the two first guideways and the at least one second guideway run in or approximately in one plane, and the at least one second guideway runs at least in sections between the two first guideways (16, 18) or sections of the two first guideways.

2. The coordinate measuring device of claim 1, wherein the carriage (24) can be displaced on two second guideways (20, 22), of which at least one runs between the two first guideways (16, 18).

3. The coordinate measuring device of claim 1, wherein the coordinate measuring device (10) is an optical or multisensor coordinate measuring device.

4. The coordinate measuring device of claim 1, wherein the top surface of the measuring table (14) is configured transparent.

5. The coordinate measuring device of claim 1, wherein the measuring table (14) is designed for a transillumination.

6. The coordinate measuring device of claim 1, wherein the first guideways and/or the at least one second guideway (16, 18, 20, 22) run at least in sections underneath the measuring table (14).

7. The coordinate measuring device of claim 1, wherein the first guideways and the at least one second guideway (16, 18, 20, 22) are located underneath the measuring table (14).

8. The coordinate measuring device of claim 1, wherein the sensors of the coordinate measuring device include sensing devices and/or image processing devices and/or laser sensing devices and/or tactile-optical fiber sensing devices.

* * * * *